US008676660B2

(12) United States Patent
Yu et al.

(10) Patent No.: US 8,676,660 B2
(45) Date of Patent: Mar. 18, 2014

(54) SYSTEM AND METHOD FOR PROVIDING A STREAMLINED CHECKOUT PROCESS

(75) Inventors: James Yu, Glenview, IL (US); Greg Franczyk, Carpentersville, IL (US); Jason Ruud, South Elgin, IL (US); Brian Jordan, West Dundee, IL (US); Robert Richard Roy, Glen Allen, VA (US); Eric J. Klondnick, Chicago, IL (US); Mahesh Bommireddy, Palatine, IL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 272 days.

(21) Appl. No.: 13/004,331

(22) Filed: Jan. 11, 2011
(Under 37 CFR 1.47)

(65) Prior Publication Data
US 2012/0179582 A1 Jul. 12, 2012

(51) Int. Cl.
*G06Q 30/00* (2012.01)
(52) U.S. Cl.
USPC .................................. 705/26.1; 705/27.1
(58) Field of Classification Search
USPC .................................................. 705/26, 27
See application file for complete search history.

(56) References Cited

U.S. PATENT DOCUMENTS

| 5,960,411 | A | 9/1999 | Hartman et al. |
| 6,970,838 | B1 * | 11/2005 | Kamath et al. ............... 705/26.4 |
| 7,359,871 | B1 * | 4/2008 | Paasche et al. ............. 705/26.8 |
| 7,610,224 | B2 * | 10/2009 | Spiegel ........................... 705/28 |
| 8,374,922 | B1 * | 2/2013 | Antony ...................... 705/26.81 |
| 2001/0047306 | A1 * | 11/2001 | Garretson ....................... 705/26 |
| 2002/0032613 | A1 * | 3/2002 | Buettgenbach et al. ........ 705/26 |
| 2003/0120505 | A1 * | 6/2003 | Spiegel ............................ 705/1 |
| 2007/0061222 | A1 * | 3/2007 | Allocca et al. ................. 705/26 |
| 2007/0299745 | A1 * | 12/2007 | Mulderry et al. .............. 705/27 |

OTHER PUBLICATIONS

Business Wire: "Electronics.net Announces Grand Re-Opening of Online Store," Business Wire, Jun. 10, 1999, Dialog file 610 #00057759, 3pgs.*

* cited by examiner

*Primary Examiner* — Rob Pond
(74) *Attorney, Agent, or Firm* — McAndrews, Held & Malloy, Ltd.

(57) ABSTRACT

Once a purchaser has proceeded through a check out experience with an online retail system, the settings established during that checkout experience will be applied to future checkout experiences by that purchaser. By capturing and thereafter using checkout settings in this manner, a purchaser can proceed from a shopping cart directly to a checkout review page with the checkout review page being pre-populated with such prior established settings. Furthermore, the methodology allows the purchaser to have a virtually unlimited number of goods in their shopping cart and to have multiple different types of order fulfillment options (e.g., shipping, store pickup, delivery to an organization, etc.) automatically established for those goods.

10 Claims, 3 Drawing Sheets

FIGURE. 2A
Checkout Review Page

Your order contains items from multiple fulfillment types with different arrival times.
Please carefully review each item and approval method

Pickup Information (2 items)

Pickup Address                                    Pickup Special Instructions (optional)
I will pickup my items from the following location:

Sears State Street Front Desk ▽     | Example (Please Use Paper bags) |

Sears           Store hours
2 N. State Street
Chicago, IL 60601                                      200 characters
(312)123-4018

Pickup Items

Your item(s) will be ready TOMORROW for delivery by 3:00 p.m., if you order by 12:00 p.m.
Get it TODAY   Your item(s) will be ready by Today for store pickup by 8:25 p.m.
○ Pay Online ● Pay by Cash/Check (in Store)
NOTE: Your Pay by Cash/Check reservation will expire in 48 hours if the order is not paid

| Item | Arrival Method | Quantity | Price |
|---|---|---|---|
| Hamilton Beach Personal Blender<br>Kmart item # 018W01442676001<br>Mfr. model # 50735<br>#2 for $17 Discount appears in cart | Pickup: Get it NOW | 1<br>Remove | $11.99<br>-$1.58 |
| Prescription for james yu<br>Rx#: lipitor 20mg<br>Special instructions for your<br>pharmacy items (optional) Edit *<br>*Please call my doctor and verify<br>my prescription dosage | Pickup: TOMORROW<br>for delivery by 3:00 p.m.<br>if you order by 12:00 p.m. | 1<br>Remove | Prescription<br>Price |

Order Summary

Pay Online
Item Subtotal:              $000.00
Total Savings:              $00.00
Delivery:                   $00.00
Shipping:                   $00.00
Sales tax:                  $00.00
Pay Online Total:           $000.00

Pay In-store Cash/Check
Item Subtotal:              $000.00
Total Savings:              $00.00
Sales tax:                  $00.00
Pay In Store Total:         $000.00

Additional discounts may apply. You'll receive
shopyourway Rewards credit for this order.

Payment Method

● Credit Card  ○ eBillme  ○ PayPal
○ Use saved credit card   ○ Add new credit card

| John Doe, Master Card (**5678), Expires 06/2011 ▽ |

Edit Expiration Date (!) Please enter the security code

Security Code  [          ]

FIGURE. 2B

Shipping Information (2 items)

◇ Items may arrive at different times if they are shipped from separate locations. This will not affect your shipping costs.

Shipping Address

| Selected | Bob Smith | | [Edit] |
| | 123 Street Name St., Chicago, IL 60601 | | |

Show My Saved Addresses
Add a new Address                                    Ship to Different Adresses

Shipping Method                                              Shipping Info
○ Standard $6.25    - Your item(s) will arrive between Oct 05 and Oct 07
● Expedited $10.00  - Your item(s) will arrive on Oct 01
○ Premium $15.00    - Your item(s) will arrive on Sep 30

NOTE: Maximum delivery time for standard shipping indicated. Click for details
Shipping Items                                      Shipping Total: $28.00

| Item | Arrival Method | Quantity | Price |
|---|---|---|---|
| Hamilton Beach Personal Blender<br>Item # 018W01443676001 | Ship Expedited<br>1-2 Bus. Days | 1<br>Remove | $11.99 |
| Logitech Webcam for Notebooks<br>Item # 018W01443676001<br>3YR In-Shop Master Protection Agreement<br>Remove  Edit | Ship Expedited<br>1-2 Bus. Days | 1<br>Remove | $11.99 |

Want a message when order is ready for pick-up?
☐ Text Message  ☐ Phone Call

Billing Address

Bob Smith, 123 Street Name St., Chicago, IL 60601

Add a New Address ←— 226

☐ Use shopyourway rewards™ card or Gift Card

Please enter your Shop Your Way Rewards number and PIN or your Gift Card Number and PIN
Locate your number and PIN Card # [          ]
PIN    [          ]  [Apply]
       ☐ Use a Promo Code By clicking Place Order you agree to be bound by the Terms and Conditions. If your purchase is made with your Sears cards, your purchase is subject to the CitiBank USA, N.A. Agreement entered into by you and CitiBank, USA, N.A. the terms of which are incorporated here.

[Place Order]

Verisign Secured

SYSTEM AND METHOD FOR PROVIDING A STREAMLINED CHECKOUT PROCESS

BACKGROUND

The subject invention generally relates to online retail services and, more particularly, relates to a system and method for providing a streamlined checkout process for use in connection with online retail services.

Systems and methods for purchasing goods and/or services ("product") via use of an online checkout process are known in the art. By way of example only, U.S. Pat. No. 5,960,411, published on Sep. 28, 1999 and incorporated herein by reference in its entirety, describes a system and method in which an order for product is placed by a purchaser at a client system and received by a server system. The server system receives purchaser information including identification of the purchaser, payment information, and shipment information from the client system. The server system then assigns a client identifier to the client system and associates the assigned client identifier with the received purchaser information. The server system sends to the client system the assigned client identifier and an HTML document identifying the product and including an order button. The client system receives and stores the assigned client identifier and receives and displays the HTML document. In response to the selection of the order button, the client system sends to the server system a request to purchase the identified product. The server system receives the request and combines the purchaser information associated with the client identifier of the client system to generate an order to purchase the product in accordance with the billing and shipment information whereby the purchaser effects the ordering of the product by selection of the order button.

SUMMARY

Described hereinafter is a system and method for providing a streamlined checkout process for use in connection with online retail services. To this end, once a purchaser has proceeded through a check out experience with the system, the settings established during that checkout experience will be applied to future checkout experiences by that purchaser. In particular, such captured settings will be used to pre-populate information that is presented to a purchaser in a checkout review page that is provided to the purchaser to thereby allow the purchaser to review the details of a purchase transaction before finalizing the same, e.g., by clicking on a "place order" icon. By capturing and thereafter using checkout settings in this manner, a purchaser can proceed from a shopping cart, product detail page, and/or the like directly to the checkout review page without having to again provide transaction related information. As a result, the number of steps required to be performed by the purchaser to submit orders for selected goods will be minimized. Furthermore, the methodology can be used to support a checkout review page in which is presented information for a virtually unlimited number of product which can be purchased through use of multiple different types of order fulfillment options (e.g., shipping, store pickup, delivery to an organization, etc.).

While the forgoing provides a general overview of some of the various features and functionalities of the subject invention, a better understanding of the objects, advantages, features, properties, and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to preferred embodiments shown in the attached drawings in which:

FIGS. 2A and 2B illustrate a screen shot of an exemplary checkout review page utilized in the system of FIG. 1 to provide a streamlined checkout process for use in connection with online retail service.

DETAILED DESCRIPTION

Figure 1:
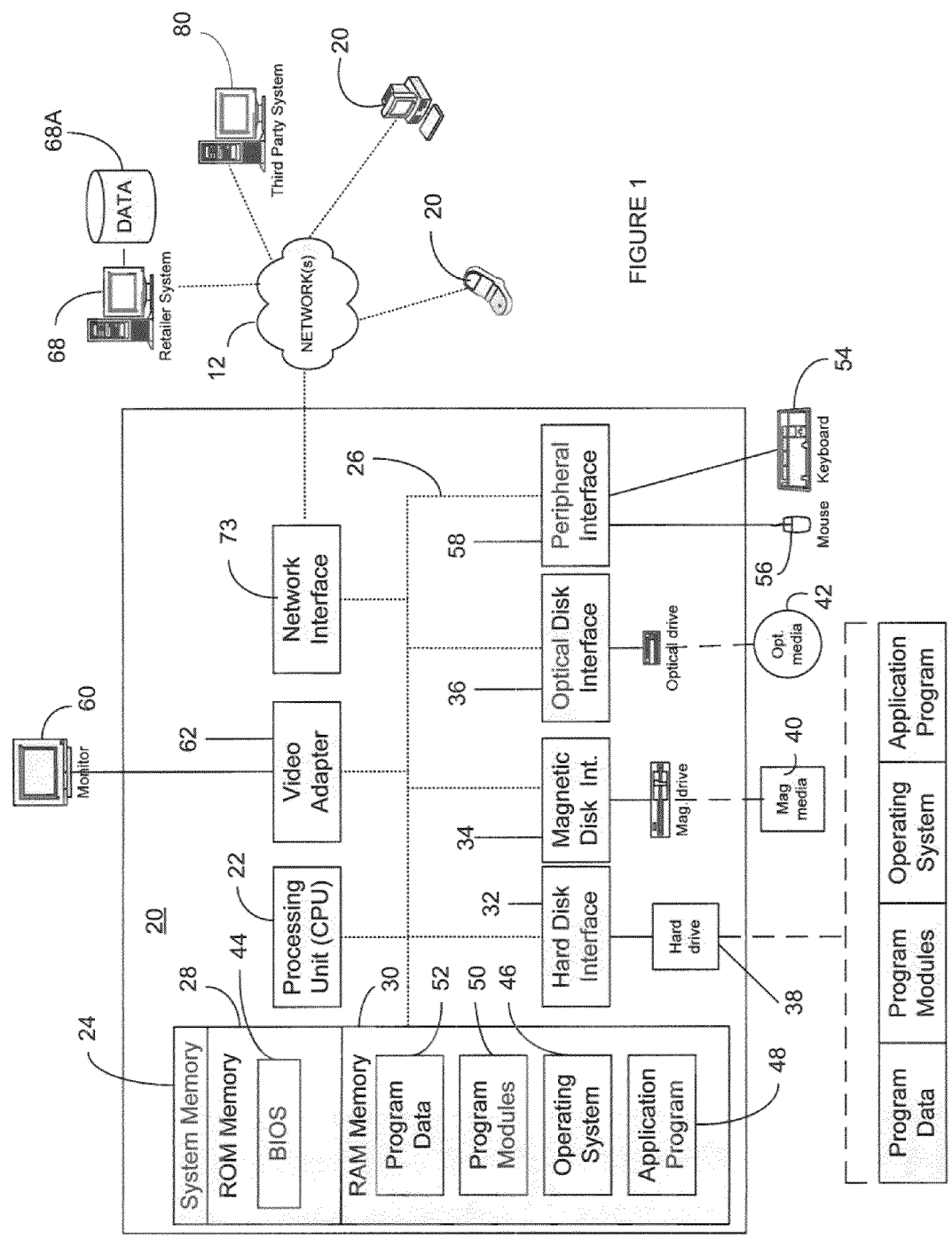
FIG. 1 illustrates in block diagram form components of an exemplary system for providing a streamlined checkout process for use in connection with online retail services.

With reference to the figures, the following describes a system and method for providing a streamlined checkout process for use in connection with online retail services. To this end, an exemplary system, illustrated in FIG. 1, includes a processing device 20 whereby a purchaser may access an online retail channel hosted by a retailer system 68 to, among other things, view and purchase product being offered for sale by a retailer. While illustrated in the exemplary form of a personal computer, it is to be understood that the processing device 20 may be embodied in any type of device having the ability to execute instructions such as, by way of example only, a personal-digital assistant ("PDA"), a cellular telephone, or the like. Furthermore, while described and illustrated in the context of a single processing device 20, those skilled in the art will also appreciate that the various tasks described hereinafter may be practiced in a distributed environment having multiple processing devices linked via a local or wide-area network, such as the Internet, whereby the executable instructions may be associated with and/or executed by one or more of the multiple processing devices.

More particularly, to provide a means for a purchaser to access the online retail channel (and to perform various other tasks as necessary) the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated physically embodied computer-readable media allow for the storage of instructions, data structures, program modules, and the like for execution by the processing unit 22 of the processing device 20. Those skilled in the art will further appreciate that other types of physically embodied computer-readable media that can store data and/or executable instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories. Meanwhile, the program modules that may be stored in one or more of the memory/media devices may include a basic input/output system (BIOS) 44 which contains the basic routines that help to transfer information between elements within the processing device 20, such as during start-up, an operating system 46, one or more applications programs 48 (such as a Web browser), other program modules 50, and/or program data 52.

To allow a purchaser to enter commands and information into the processing device 20, e.g., to search for and purchase product, indicate how an order for product is to be fulfilled, etc., input devices such as a touch pad or keyboard 54 and/or a pointing device 56 are provided. While not illustrated, other input devices may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

As noted above, the processing device 20 may also utilize logical connections to one or more remote processing devices, such as a retailer system 68 having associated data repository 68A. As will be understood, the data repository 68A may maintain a database of product that is being sold by the retailer, purchaser information (including information concerning past checkout experiences of particular purchasers), financial information, and the like type of data used in commerce. While the retailer system 68 has been illustrated in the exemplary form of a server computer, it will be appreciated that the retailer system 68 may, like processing device 20, be any type of device having processing capabilities. Similarly, it will be appreciated that the retailer system 68 need not be implemented as a single device but may be implemented in a manner such that the tasks performed by the retailer system 68 are distributed amongst a plurality of processing devices/databases located at the same or different geographical locations and linked through a communication network. Additionally, the retailer system 68 may have logical connections to other systems third party systems 80 via the network 12 and, via such connections, will be associated with functions that are supported by and data repositories that are linked to such other third party systems. Such third party systems may include, without limitation, systems of banking, credit, or other financial institutions, systems of third party providers of product, systems of shipping/delivery companies, systems that support social networking, etc.

For performing tasks as needed, the retailer system 68 may include many or all of the elements described above relative to the processing device 20. In addition, the retailer system 68 would generally include executable instructions that are likewise stored on physically embodied memory devices for, among other things, supporting online retail channel services, supporting physical retail channel POS services, maintaining records, etc. To this end, the retailer system 68 may additionally include links to point-of-sale devices, e.g., cash registers, that are located within one or more retail stores and the like without limitation.

Communications between the processing device 20 and the retailer system 68 may be exchanged via a further processing device, such as a network router, that is responsible for network routing. Communications with the network router may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) associated with the retailer system 68.

As noted above, the subject invention, particularly the retailer system 68, functions to support a system that provides a streamlined checkout process for use in connection with online retail services. To this end, a purchaser may access the retailer system 68 and browse a catalog of product being offered for sale via the retailer system 68 and indicate a desire to purchase product of interest from the retailer, e.g., the purchaser may view and access product detail pages and from the product detail page place product into a shopping cart or otherwise proceed directly to checkout to thereby effect a purchase of product of interest. While a purchaser may access a checkout page for the purpose of purchasing product via interaction with a product detail page and/or a shopping cart page, it is to be appreciated that a purchaser can equally access a checkout page from other pages provided to the purchaser by the retailer system 68. By way of additional example and without limitation, a checkout page can be accessed by a purchaser interacting with pages that present listings of product previously purchased by the purchaser, that present listings of product desired to be purchased by the purchaser, that present listings of product purchased by associates or friends of the purchaser, etc.

When a purchaser known to the retailer system 68, e.g., a purchaser that has accessed the retailer system 68 with a provided ID/password pair, with a cookie stored on their computer, etc., proceeds to checkout for the purpose of purchasing product of interest, a checkout review page, an example of which is shown in FIG. 2, is caused by the instructions associated with the retailer system 68 to be presented to the purchaser. The checkout review page functions to display to the purchaser all product that has been selected by the purchaser for purchase as well as the current fulfillment option by which each of the selected product is to provided to the purchaser. In this regard, for certain product as appropriate, the purchaser may be provided with options, for example on a product detail page, shopping cart page, or the like, whereby the user can specify to the retailer system 68 one of various different types of fulfillment options for that product. By way of further example, fulfillment options for a product that may be selected by a user, if available for a given product, may include an option to pick-up the ordered product at a given location, to have the ordered product shipped to a home address, to have the ordered product delivered to a business address, etc. As will be appreciated, for certain product, such as regulated items (e.g., prescriptions, alcohol, etc.), only an in-store pickup fulfillment option may be made available to the purchaser.

More particularly, the checkout review page functions to present to the purchaser an organized listing of all currently selected product wherein the selected product is organized according to the current fulfillment option by which each of the selected product is to provided to the purchaser. In the example illustrated in FIG. 2, because each of the products 202 and 204 was selected for or otherwise limited to the fulfillment option "Pickup Items," the products 202 and 204 are presented together within the checkout review page as falling within the "Pickup Items" fulfillment option category with all of the relevant information associated with the "Pickup Items" fulfillment option additionally presented to the purchaser in the checkout review page. Likewise, because each of the product 206 and 208 was selected for or otherwise limited to the fulfillment option "Shipping," the products 206 and 208 are presented together within the checkout review page as falling with the "Shipping" fulfillment option category with all of the relevant information associated with the "Shipping" fulfillment option additionally presented to the purchaser in the checkout review page. As will be appreciated, similar presentations of products and information may be made available in the checkout review page for any other fulfillment options that may be relevant for product selected by the purchaser.

Considering the fulfillment option information that is presented to the purchaser in the checkout review page, because the purchaser is known to the retail system 68, the fulfillment option information is preferably pre-populated using information that has been captured from that purchaser, organization of which the purchaser is a member, or the like, in the past. For example, the information 210 associated with the "Pickup Item" fulfillment option that is presented within the checkout review page, which information specifies to the purchaser how the fulfillment option will be realized if the order is placed, may default to the last location (and possibly pickup time) at which the purchaser picked-up product. To the extent that the purchaser would like to change how the presently presented fulfillment option for "Pickup Item" is to be realized, a drop down list 212 or the like type of user interface element may be made available to the purchaser whereby the purchaser can easily select a different location and/or pickup time at which pickup is to be made of the corresponding "to-be picked up" product 202 and/or 204. In the case of "Pickup Item" fulfillment, the alternative pickup locations that may be made available for selection by the user via the drop down list 210 would normally be pre-established by the retailer. In a similar manner, the information 214 associated with the "Shipping" fulfillment option that is presented within the checkout review page may default to the last location to which the purchaser had product shipped. To the extent that the purchaser would like to change how the presently presented fulfillment option for "Shipment" is to be realized, a drop down list 216 or the like type of user interface element may be made available to the purchaser whereby the purchaser can easily select a different location to which (or shipping method by which) the "to-be shipped" product 206 and/or 208 is to be shipped, e.g., an address to which product was previously shipped to the purchaser or an address that was otherwise specified to the retailer system 68 by the purchaser. Still further, an option 216 may be presented to the purchaser whereby the purchaser may specify to the retailer system 68 a new address to which the "to-be-shipped" product 206 and/or 208 is to be shipped. With respect to product shipment, while multiple items are preferably consolidated for shipment from a single origin location (store, warehouse, etc.) based on the zip-code address of the current ship-to address, it may be desired to provide the purchaser with the option to change product origin location and/or grouping(s) of product to be shipped together to thereby allow the purchaser to obtain product as required. As will be appreciated, pre-populated information and change options may be presented to the purchaser for any additional fulfillment options, such as delivery to an organization or the like.

The checkout review page will additionally present to the purchaser payment and billing information for their current product and fulfillment selections which payment and billing information is again preferably pre-populated using information that has been captured from that purchaser, organization of which the purchaser is a member, or the like, in the past. For example, the billing and payment information 218 associated with the "Pickup Item" fulfillment option that is presented within the checkout review page, which information specifies to the purchaser how payment is to be made if the order is placed, may default to the last payment method used by the purchaser when the purchaser last picked up product that was ordered via the retailer system 68, e.g., they paid by cash in the store. To the extent that the purchaser would like to change how they would like to pay for the "to-be picked up" product 202 and/or 204, additional selectable options may be presented to the purchaser, e.g., pay online. In the event that payment is to be made online, the system may additionally default to the last online payment method 220, e.g., credit card, that was used by the purchaser when paying online, again providing the purchaser with the option 222 to change this currently specified, online payment method. Similarly, in the event that payment is to be made by billing, the system may default to present as the billing information 224 the last billing address that was used by the purchaser when purchasing product via billing with the purchaser once again being provided with the option 226 to change the currently presented billing information. If the last payment method utilized by the purchaser was a gift card, the retailer system 68 may determine if the amount left on the gift card is sufficient to cover the needed payments and, if not, the retailer system 68 may default to use a previously provided credit/debit card as the currently displayed form of payment.

From the foregoing, it will be appreciated that, through use of the described checkout review page, a purchaser is presented with a single page that sets forth pre-populated fulfillment and payment options for product to be purchased, from which the purchaser need only click a further "place order" button 230 to execute the retail transaction according to the terms and conditions set forth thereon. As will be further appreciated, it is by use of the described checkout review page that the system and method provides a purchaser with a streamlined checkout process.

While various concepts have been described in detail, it will be appreciated by those skilled in the art that modifications and alternatives to those concepts could be developed in light of the overall teachings of the disclosure. For example, those of skill in the art will appreciate that the ordering of the steps described herein and illustrated in the figures can be modified without departing from the scope of the invention claimed hereinafter. Similarly, those of skill the art will appreciate that certain of the steps described herein may be considered to be optional. Yet further, while various aspects of the invention have been described in the context of functional modules and components, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of the modules used to perform the various described functions is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person knowledgeable in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A computer-readable media embodied on a non-transient, physical memory device having stored thereon computer executable instructions executable by a retailer computer system to provide a streamlined checkout process for use in connection with online retail services, the instructions performing steps, comprising:

storing purchaser information comprising payment information and fulfillment option information associated with a purchaser; and in response to a received request from the purchaser to proceed to checkout to thereby purchase product via an online retail channel associated with the retailer system, causing a checkout review page to be presented to the purchaser, wherein the checkout review page is used by the purchaser to generate an order to the retailer system to purchase product in accordance with billing and payment information and order fulfillment information that is presented to the purchaser within the checkout review page, wherein product information presented within the checkout review page is further categorized according to a plurality of different types of fulfillment options, and wherein billing and payment information and order fulfillment information for each relevant one of the plurality of different types of fulfillment options is pre-populated in the checkout review page using the stored purchaser information.

2. The computer-readable media as recited in claim 1, wherein the instructions present within the checkout review page one or more user interface elements for allowing the purchaser to change the billing and payment information from the pre-populated billing and payment information presented to the purchaser in the checkout review page.

3. The computer-readable media as recited in claim 1, wherein the instructions present within the checkout review page one or more user interface elements for allowing the purchaser to change the order fulfillment information for each relevant one of the plurality of different types of fulfillment options from the pre-populated order fulfillment information presented to the purchaser in the checkout review page.

4. The computer-readable media as recited in claim 1, wherein the plurality of different types of fulfillment options comprise a pickup order fulfillment option and a shipping order fulfillment option.

5. The computer-readable media as recited in claim 4, wherein the plurality of different types of fulfillment options further comprises a delivery order fulfillment option.

6. The computer-readable media as recited in claim 4, wherein the order fulfillment information for the pickup order fulfillment option comprises at least a location and time for pickup of relevant product.

7. The computer-readable media as recited in claim 4, wherein the order fulfillment information for the shipping order fulfillment option comprises at least a shipping address of the purchaser.

8. The computer-readable media as recited in claim 7, wherein the order fulfillment information for the shipping order fulfillment option further comprises shipping method information.

9. The computer-readable media as recited in claim 8, wherein the instructions present within the checkout review page one or more user interface elements for allowing the purchaser to change bundling of product to be shipping via the shipping order fulfillment option.

10. The computer-readable media as recited in claim 1, wherein the billing and payment information and the order fulfillment information for each relevant one of the plurality of different types of fulfillment options is pre-populated using information captured from a most recent, previous purchasing experience of the purchaser.

* * * * *